Dec. 29, 1925.

W. S. PRITCHARD 1,567,749

SAW FILING MACHINE

Filed August 27, 1920

Inventor
William S. Pritchard

By Whittemore Hulbert & Whittemore
Attorneys

Patented Dec. 29, 1925.

1,567,749

UNITED STATES PATENT OFFICE.

WILLIAM S. PRITCHARD, OF DETROIT, MICHIGAN.

SAW-FILING MACHINE.

Application filed August 27, 1920. Serial No. 406,297.

*To all whom it may concern:*

Be it known that I, WILLIAM S. PRITCHARD, a citizen of the United States of America, residing at Detroit, in the county of Wayne and State of Michigan, have invented certain new and useful Improvements in Saw-Filing Machines, of which the following is a specification, reference being had therein to the accompanying drawings.

The invention relates to machines for filing saws, and has for its object the provision of a construction for varying the angle between the saw and the path of travel of the abrasive means engageable with the saw. Other objects of the invention reside in the novel features of construction and arrangements of parts as more fully hereinafter set forth.

Figure 1:
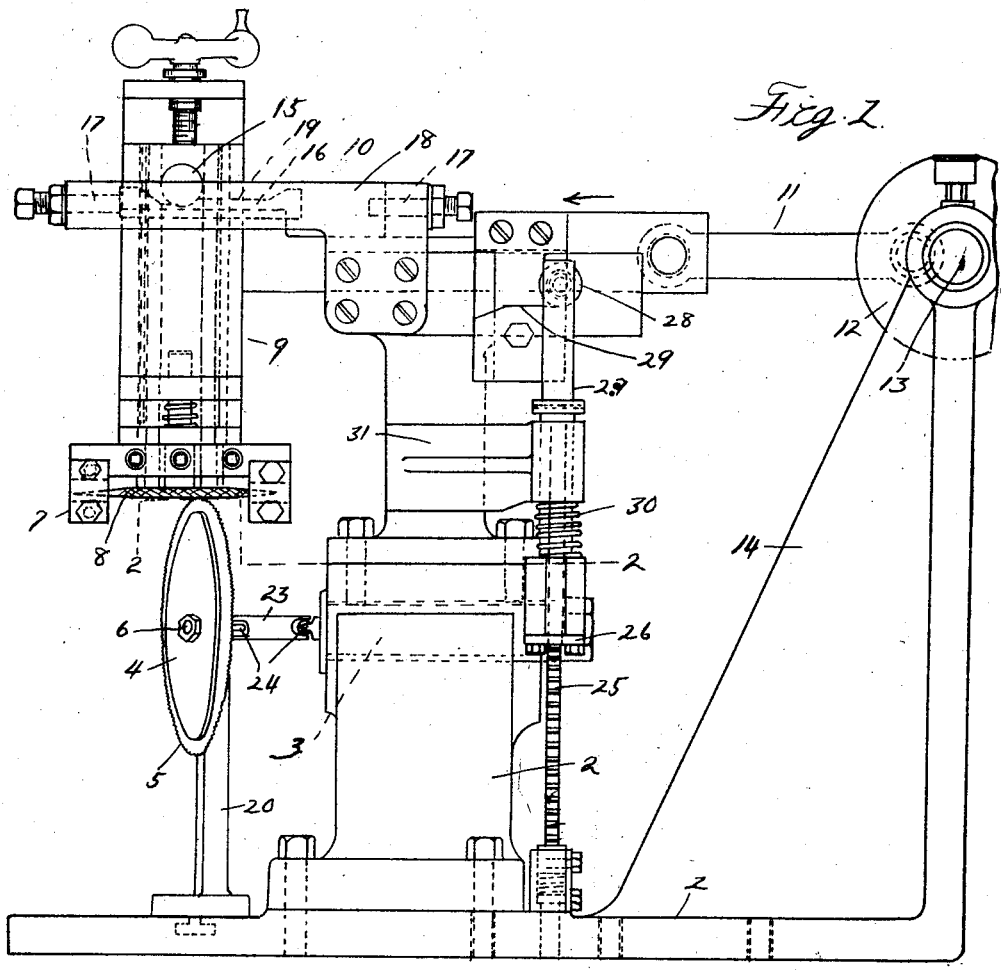
Figure 1 is a side elevation of a construction embodying my invention.
Figure 2:
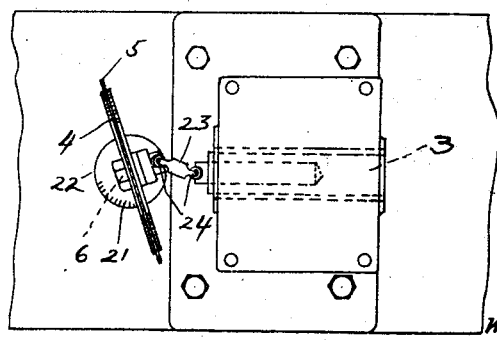
Figure 2 is a cross section on the line 2—2 of Figure 1.

For certain classes of saws, such as wood working saws, it is desirable to have the faces of the teeth at an angle to the plane of the saw. With my machine, the saw can be set at any desired angle to the path of travel of the file and without interfering with the indexing of the saw. As shown, the frame comprises the base 1 and the standard 2, mounted thereon. 3 is an arbor journaled in the standard, and 4 is a clamp for the circular saw 5, this clamp being mounted upon the shaft 6 which is rotatably driven from the arbor. 7 is a head adapted to carry the file 8 which extends transversely of the saw and is engageable with the saw teeth. 9 is a support for the head having the laterally extending arm 10 slidably mounted in the upper end of the standard 2, this support being reciprocable transversely of the saw and being actuated by suitable means such as the connecting rod 11 pivotally connected to the rear end of the arm and to a crank wheel 12 upon the shaft 13 which is journaled in the standard 14 mounted upon the base 1.

During the greater portion of travel of the file in the direction indicated by the arrow in Figure 1, the file engages the saw teeth, but it is relieved from engagement therewith near the end of the travel in this direction, when it is raised by suitable means, which in the present instance comprises the roller 15 secured to the head 7 and resting upon the cam 16. This cam is slidably mounted upon the support 9 and is adapted to be moved therewith, through a portion of its travel in both directions by means of the friction between the support and cam. Adjustable stops 17 upon the yoke 18 fixed to the standard 2 are adapted to engage the opposite ends of the cam 16 to limit its travel. The arrangement is such that when the support and head are near their end of travel as indicated by the arrow, the cam comes into engagement with the rear stop 17, and upon continued movement of the support and head, the roller 15 rides up on the raised surface 19 of the cam, thereby raising the head and file to relieve the file from engagement with the saw teeth. Upon movement of the support and head in the opposite direction, the cam 16 also moves therewith until engaged by the forward stop 17, when upon continued movement of the support and head, the roller 15 rides off the raised surface of the cam and allows the file to lower into re-engagement with the saw teeth.

For the purpose of varying the angle of the saw, relative to the path of travel of the file, the shaft 6, upon which the saw is clamped, is journaled in the standard 20 which is mounted upon the base 1. This standard is rotatable about its longitudinal axis and has the graduations 21 which are suitably located upon its base for cooperating with a suitable indication 22 upon the base 1 to indicate the degree of rotation of the standard and correspondingly of the saw.

To index the saw, the shaft 6 is connected to the arbor 3 by means of the universal drive connection 23 which comprises the two universal joints 24. The arbor 3 is adapted to be rotated a predetermined degree while the file 8 is out of engagement with the saw 5, and as shown, this index mechanism comprises the gear wheel 25 fixedly secured to the rear end of the arbor and adapted to be engaged by the dog 26 which is mounted upon the rod 27 having the roller 28 at its upper end riding upon the cam 29 fixedly secured to the laterally extending arm 10 and reciprocable therewith. 30 is a coil spring surrounding the rod 27 and abutting the dog 26 and the arm 31 for maintaining the roller 28 in engagement with its cam. The preferred embodiment of my index mechanism is described and shown in my Patent 1,417,687 issued May 30, 1922.

What I claim as my invention is:

1. The combination with reciprocating abrasive means, of means for holding a circular saw extending transversely of the path of travel of said abrasive means, said holding means being adjustable to vary the angle between said saw and path of travel of said abrasive means, and means for rotatably indexing said saw including a universal drive connection.

2. The combination with a frame, of a support for a file slidably mounted upon said frame, an arbor rotatably mounted upon said frame, a standard adjustably rotatable about its longitudinal axis, a shaft extending transversely of said standard and mounted thereon, said shaft adapted to carry a saw extending transversely of the file and engageable thereby, a universal drive connection between said arbor and shaft, and means for rotating said shaft.

3. The combination with a reciprocating abrasive member, of means for holding a circular saw extending transversely of the path of travel of and engageable by said abrasive member, said saw holding means being adjustable to vary the angle between the plane of said saw and path of travel of said abrasive member, and means for rotatably indexing said saw including a universal drive connection.

4. The combination with an abrasive member, of means for holding a circular saw extending transversely of and engageable by said abrasive member, said saw holding means being adjustable to vary the angle between said abrastive member and the saw, means for producing relative movement between said abrasive member and saw holding means in a path crosswise of the saw, and means operatively connected to said saw holding means and operating, when actuated to rotatably index the saw.

5. The combination with a frame of an abrasive member, a support for said abrasive member mounted upon said frame, an arbor rotatably mounted upon said frame, a standard rotatable about its longitudinal axis, a shaft mountetd upon said standard, said shaft adapted to carry a saw, engageable by said abrasive member, a universal drive connection between said arbor and shaft and means for adjustably moving said shaft in a path crosswise of the saw and for rotating said arbor.

In testimony whereof I affix my signature.

WILLIAM S. PRITCHARD.